United States Patent [19]

Crouch et al.

[11] Patent Number: 4,625,078

[45] Date of Patent: Nov. 25, 1986

[54] FRAUD PREVENTION IN AN ELECTRONIC COIN TELEPHONE SET

[75] Inventors: Paul E. Crouch, Freehold, N.J.; Joseph J. Nahas, Wyomissing Hills, Pa.; Howard Ng, Old Bridge, N.J.

[73] Assignees: AT&T Technologies Inc.; AT&T Bell Laboratories, both of Murray Hill, N.J.

[21] Appl. No.: 567,053

[22] Filed: Dec. 30, 1983

[51] Int. Cl.$^4$ .................................... H04M 17/02
[52] U.S. Cl. ................................. 379/145; 194/317
[58] Field of Search ............... 179/6.3 R, 6.3 MA; 194/99, 100 R, 100 A

[56] References Cited

U.S. PATENT DOCUMENTS

| | | | |
|---|---|---|---|
| 3,797,628 | 3/1974 | Fougere et al. | 194/99 |
| 4,124,111 | 11/1978 | Hayashi | 194/102 |
| 4,197,425 | 4/1980 | Secrett et al. | 179/213 C |
| 4,333,557 | 6/1982 | Kozak | 194/97 A |
| 4,334,604 | 6/1982 | Davies | 194/100 A |
| 4,358,640 | 11/1982 | Murray | 179/90 D |
| 4,436,196 | 3/1984 | Crisp et al. | 194/100 A |
| 4,469,213 | 9/1984 | Nicholson et al. | 194/100 A |
| 4,482,787 | 11/1984 | Sagara et al. | 179/90 D |
| 4,483,431 | 11/1984 | Pratt | 194/97 A |
| 4,488,116 | 12/1984 | Plesko | 324/236 |

*Primary Examiner*—Robert G. Lev
*Attorney, Agent, or Firm*—Samuel R. Williamson

[57] ABSTRACT

This invention pertains to a microcomputer controlled coin telephone set which prevents coin call fraud and performs all of the coin discrimination functions. The microcomputer also checks the operational readiness of the telephone set to prevent the acceptance of coins into a hopper for late collection by a coin box unless or until the set is fully functional.

8 Claims, 21 Drawing Figures

LED DRIVER AND CONTROL LOGIC PHOTOSENSOR CIRCUITRY

FIG. 4 L+ RAIL AND PULL UP, VCC CURRENT REFERENCE, TEMPERATURE COMPENSATED CURRENT SOURCE

COIN ACCEPTOR CURRENT SWITCH,
VOLTAGE SENSOR DRIVER, LOGIC

INITIAL RATE LOGIC AND DRIVER

TROUBLE RELAY DRIVER, RESET BUFFER, MAKE FLIP-FLOP BREAK FLIP-FLOP, LOGIC AND POWER ON RESET

INITIALIZATION

FIG. 12
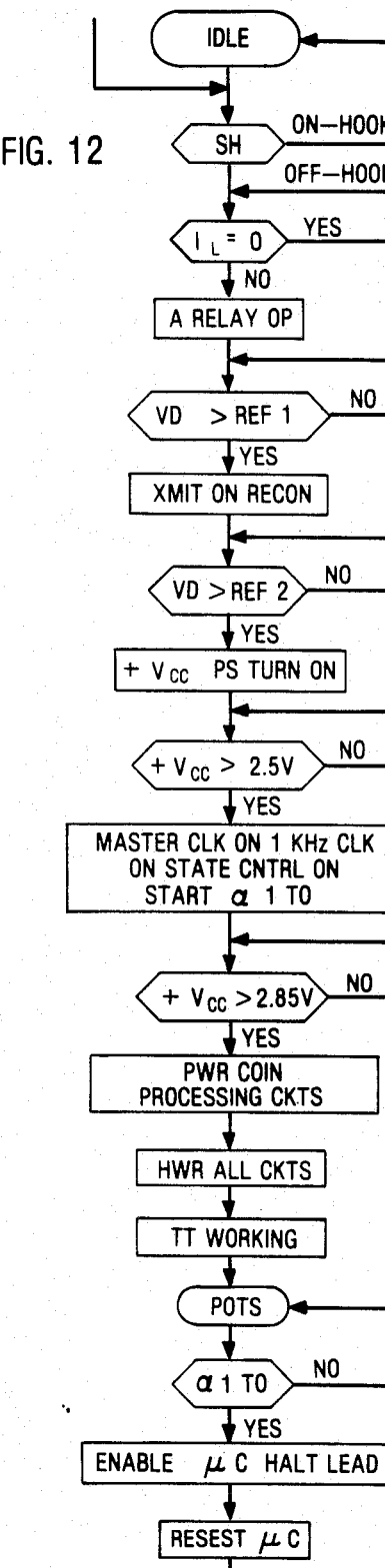
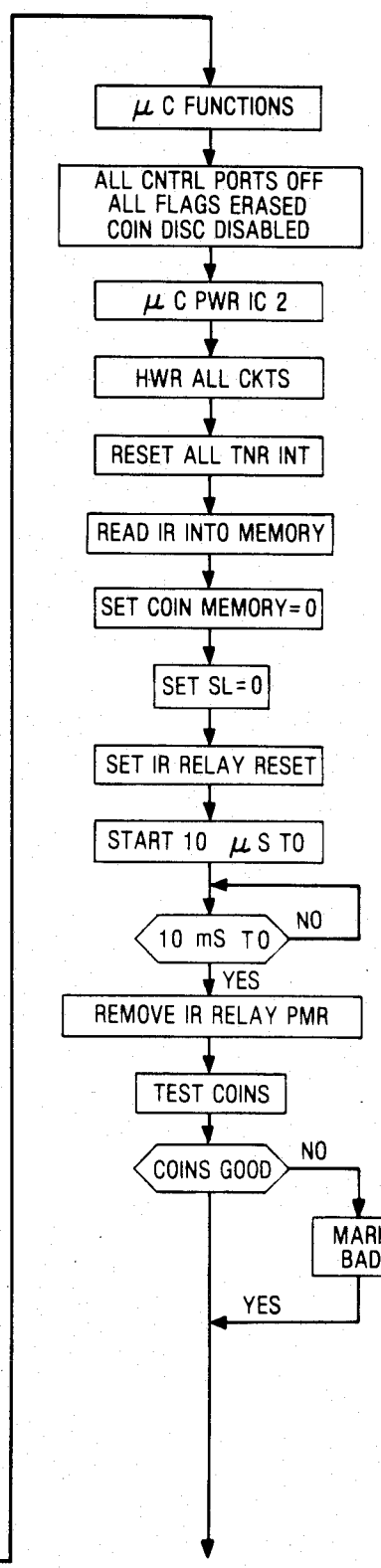

FIG. 13
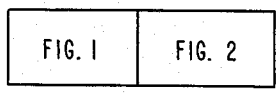
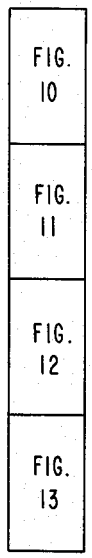
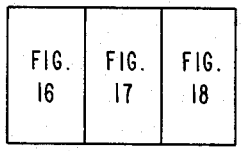
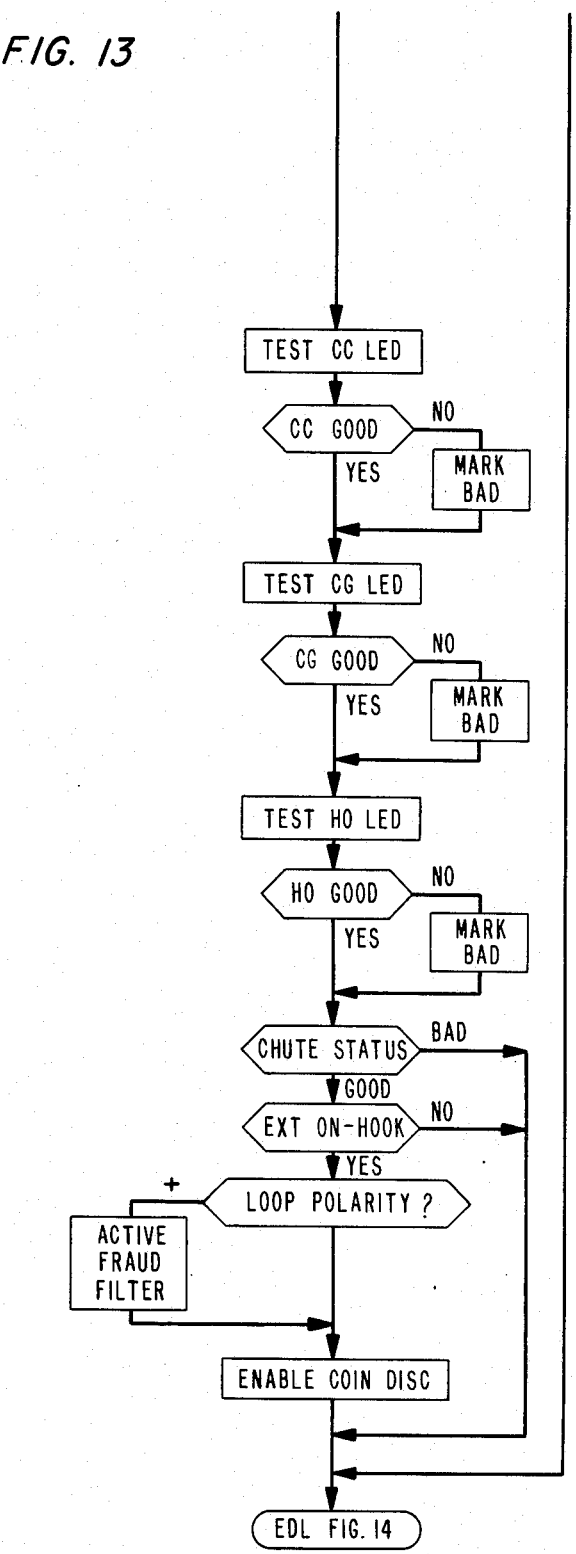

COIN GOING ROUTINE

FRAUD PREVENTION IN AN ELECTRONIC COIN TELEPHONE SET

BACKGROUND OF THE INVENTION

1. Technical Field

The present invention relates to coin-operated telephones, and more specifically, to control equipment within a coin-operated telephone set which guards against generating fraudulent coin tones.

2. Description of the Prior Art

Telephone company improvement programs in the last decade have resulted in a multitude of coin service innovations which serve customer needs and reduce operating costs. Illustratively, the programs have modified coin service from prepay to dial-tone-first operation and have provided free coin service for special numbers, such as the 911 emergency code. In addition, single slot pay stations have been introduced for flexibility in deposits, improved transmission, and reductions in vandalism and theft.

Despite the improvements achieved, telephone companies heretofore have not adequately solved the problems of fraud on coin calls and the inefficient and costly procedures for scheduling and collecting paystation coin boxes. Occasionally, the companies are subjected to fraud due to customer simulations of coin deposits by false ground start signaling and by counterfeit tones from so-called red box devices. The scheduling procedure has proven deficient because the telephone companies have inadequate information as to the coin box fill. High cost and inefficiency arise in collection arrangements because telephone companies utilize many precautionary measures to safeguard against theft following the removal of the coin box from the paystation by telephone company employees. The precautions are taken because the companies have insufficient accumulated data concerning the total amount of money in a collected box.

In view of the foregoing, it is apparent that a need exists for facilities and procedures which prevent coin call fraud and provide adequate data on coin deposits for enabling telephone companies to schedule efficiently and collect coin boxes at reasonable cost and without the necessity for burdensome integrity check precautions in the collection operations.

SUMMARY OF THE INVENTION

In the present invention, a microcomputer controlled coin telephone set utilizes electronics to eliminate much of the electro-mechanical complexity of existing coin sets.

Under the control of a microcomputer, the set prevents coin call fraud and performs all of the coin discrimination functions. The microcomputer also checks the operational readiness of the telephone set to prevent the acceptance of coins into a hopper for later collection by a coin box unless or until the set is fully functional. Capable of being interrogated remotely, a local memory is used for storing coin deposit information and generating coin deposit signals in order of deposit to a central office.

BRIEF DESCRIPTION OF THE DRAWINGS

FIGS. 10 through 18 show flow charts of some of the functions performed by the circuitry in FIGS. 1 and 2; and FIGS. 19, 20 and 21 shows the spacial arrangements of FIGS. 1 and 2, 10 through 13, and 16 through 18 respectively.

DETAILED DESCRIPTION

Figure 1:
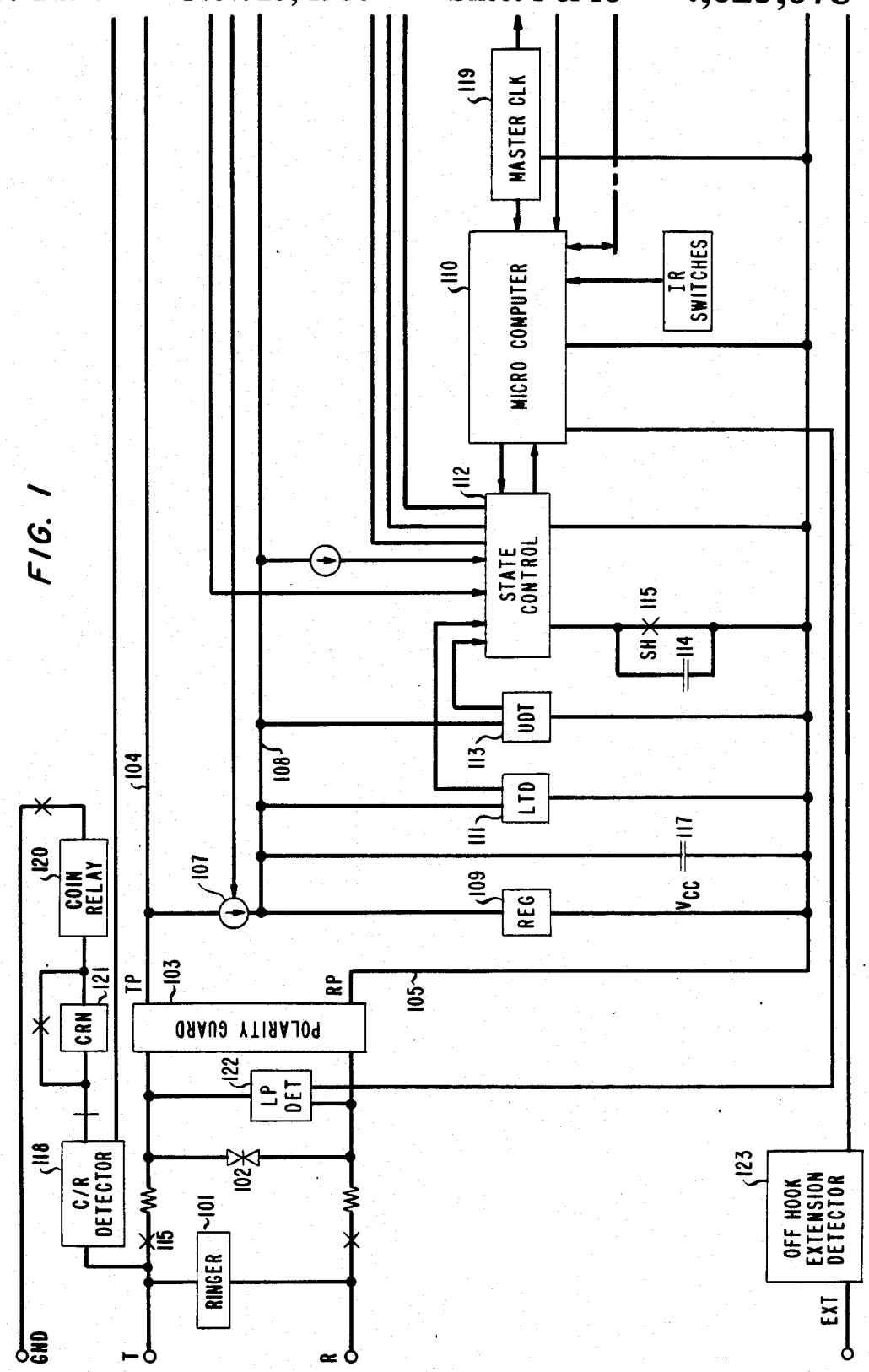
FIGS. 1 and 2 show a block diagram of the major functional components of the electronic coin telephone set.
Figure 2:
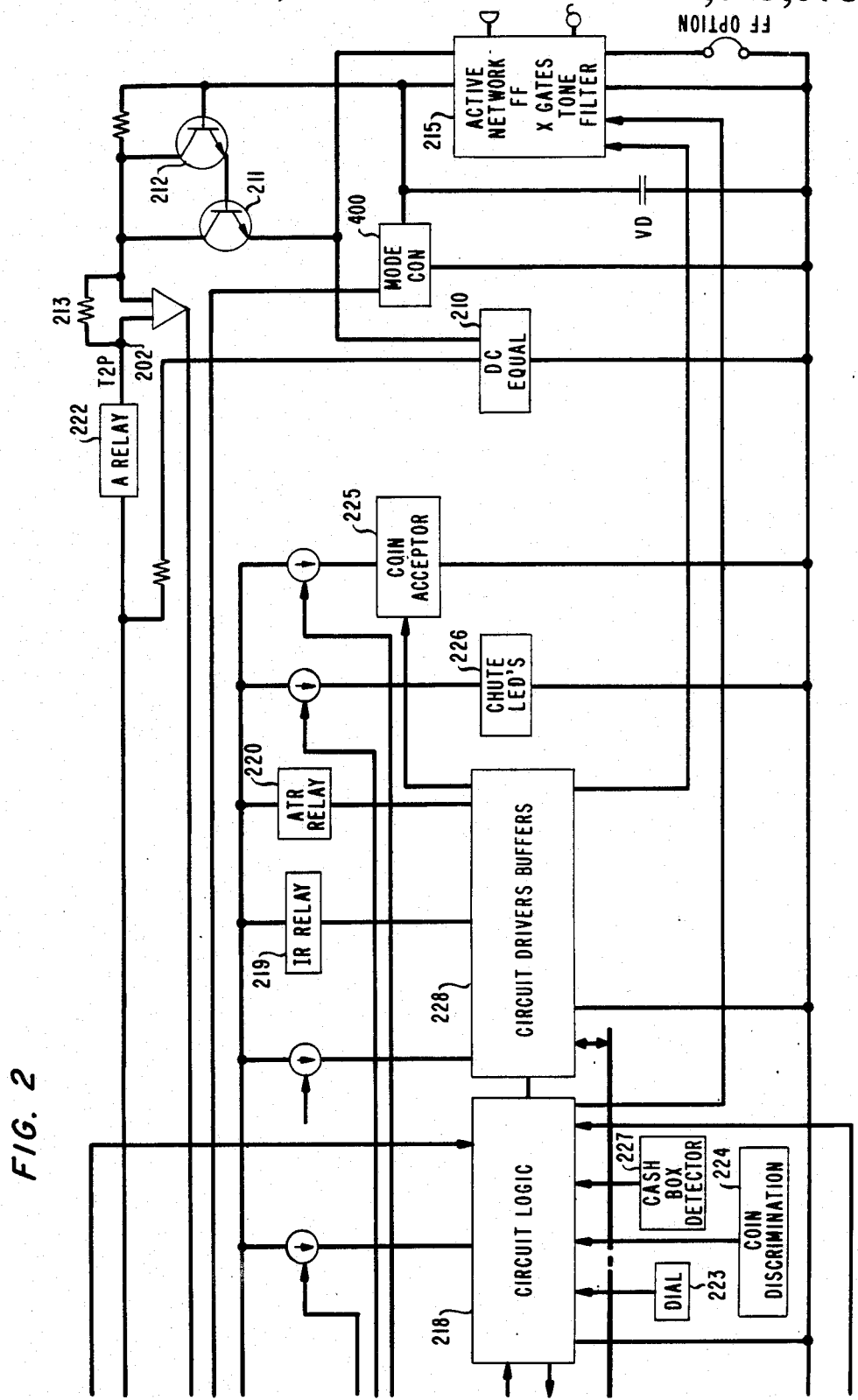

Referring now to FIGS. 1 and 2 of the drawing, in accordance with the present invention there is shown a block diagram of an electronic coin telephone with a ringer 101, a varistor 102 and a polarity guard 103 which are included to show an illustrative connection between a coin-operated telephone in accordance with the invention and the tip and ring terminals of a telephone line. Operating under the control of a microcomputer 110, the acceptance of coins into the hopper is prevented unless or until the set is fully functional. This is determined by the microcomputer 110 performing operational readiness checks on the coin chute and all coin processing circuitry.

Also contained in the telephone set is a collect or refund detector 118 that senses when the set receives a collect or refund voltage from the central office. This information is provided to a circuit logic section which, in turn, either activates a coin relay 120 and collects the coins deposited or returns them to the customer.

A VCC current supply 107 supplies a constant 14 mA of current to feed the VCC rail 108. It is turned on and off by the mode control circuitry 400 thereby allowing the active network 215 to go to a speech-only mode when insufficient loop current is available. The telephone then operates as a Plain Old Telephone Service (POTS) set. A voltage regulator 109 is used to regulate the VCC rail to the desired voltage. Any excess current from the VCC current source 107 that is not used by the microcomputer 110 or the other circuits will be dissipated by the voltage regulator 109. A lower threshold detector 111 determines if the VCC rail 108 is above a predetermined lower threshold voltage of 2.5 volts. The output of this detector is used by a state control 112 to sequence the state of the telephone set. An upper threshold detector 113 is identical to the lower threshold detector 111 with the exception that it has a higher predetermined threshold of 2.8 volts, instead of 2.5 V as its threshold. The output of this detector is also provided to the state control 112.

The state control 112 sequences the logic circuits in the telephone set in the proper states according to loop power and system requirements. This section provides a control of power to the logic circuits by turning on and off the associated power supplies as appropriate and also enable other coin processing circuits. The state control also provides an interface to the microcomputer 110 control lines. These lines are used to reset the microcomputer 110 and also to hold it in a low power state. They are also used to interrupt the microcomputer 110 due to timer timeout, external interruption, or finally informs the microcomputer that loop power disappeared so that it can start a power down sequence.

The state control 112 also retains status of the system during loop power interruptions through two internal memory latches - a collect or refund latch and a sleep latch. The sleep latch is designed as a memory element that informs the microcomputer 110 whether the loop interruption was long enough to warrant a new call origination or just a short interruption (same call). The CR latch informs the microcomputer 110 whether a collect or refund signal was present. And lastly, the state control generates a power-on-reset signal to all logic circuits on the telephone set whenever they are turned on.

A DC equalization circuit (DCE) 210 establishes the voltage-current characteristics of the telephone set. This is accomplished by effectively switching between DC loads as a function of set voltage. When the power available to the set exceeds the total power required for each mode of operation the remaining power is dissipated by the DC equalization circuit. Monitoring the set input voltage, the DC equalization circuit maintains a minimum set operate voltage in the full-feature mode.

The DC equalization circuit is comprised of two current shunt branches, a low current and a high current branch. The low current branch provides the level shifting required to maintain the minimum full-feature set voltage. At the point where this voltage is reached the high current shunt branch becomes active. The current in this branch is sensed by the mode control circuit 400 and used to determine when sufficient power is available to switch into the full-feature mode of operation.

The high current branch connects to TP on lead 104 and the low current branch connects via a Darlington pair transistor 211 and 212 and a resistor 213 on lead 202.

The loop polarity detector 122 monitors the polarity of the telephone line and provides a signal indication to the microprocessor 110 whenever the polarity is positive. And an off-hook extension detector 123 provides a control signal to the circuit logic 218 whenever an extension telephone is off-hook. The A relay 222 operates whenever loop current is present by removing the station ground, and replacing the ground when loop current is not present.

For tone dialing, a dial 223 is incorporated into the telephone set. Dials suitable for such use are known in the art. Two such dials are disclosed in U.S. Pat. No. 4,196,318 issued to D. H. Nelson on Apr. 1, 1980 and U.S. Pat. No. 4,352,958 issued to P. C. Davis et al. on Oct. 5, 1982.

A coin discrimination circuit 224 is provided for checking the material composition of the coin for determining if the coin deposited is valid or some type of slug. In addition, the circuit also uses chute LEDs 226 to measure the size of the coins. Coin discrimination arrangements are known and are presently available in the art. Two such arrangements suitable for use in the coin discrimination circuit are respectively disclosed in U.S. Pat. No. 3,741,363 issued to A. Hinterstocker on June 26, 1973 and U.S. Pat. No. 3,682,286 issued to G. Prumm on Aug. 8, 1972.

Under the control of the microcomputer 110 coin acceptor circuit 225 is provided for operation of the coin relay 120. An operate signal to this relay will cause coins tested good by the coin discrimination circuit 224 to be placed into the hopper.

In order to provide for accurate cash-box accounting, the cash box detector 227 is provided. It comprises a mechanical switch whose state is changed each time the cash box vault door is removed. This arrangement provides for transmitting 1700 Hz and 2200 Hz for all coin tones until the cash box is changed, at which time the frequencies will change to 1537 Hz and 2200 Hz for the duration that the cash box is installed in the set. When the cash box is again changed, the set will revert back to 1700 Hz and 2200 Hz until the cash box is changed again.

Figure 3:
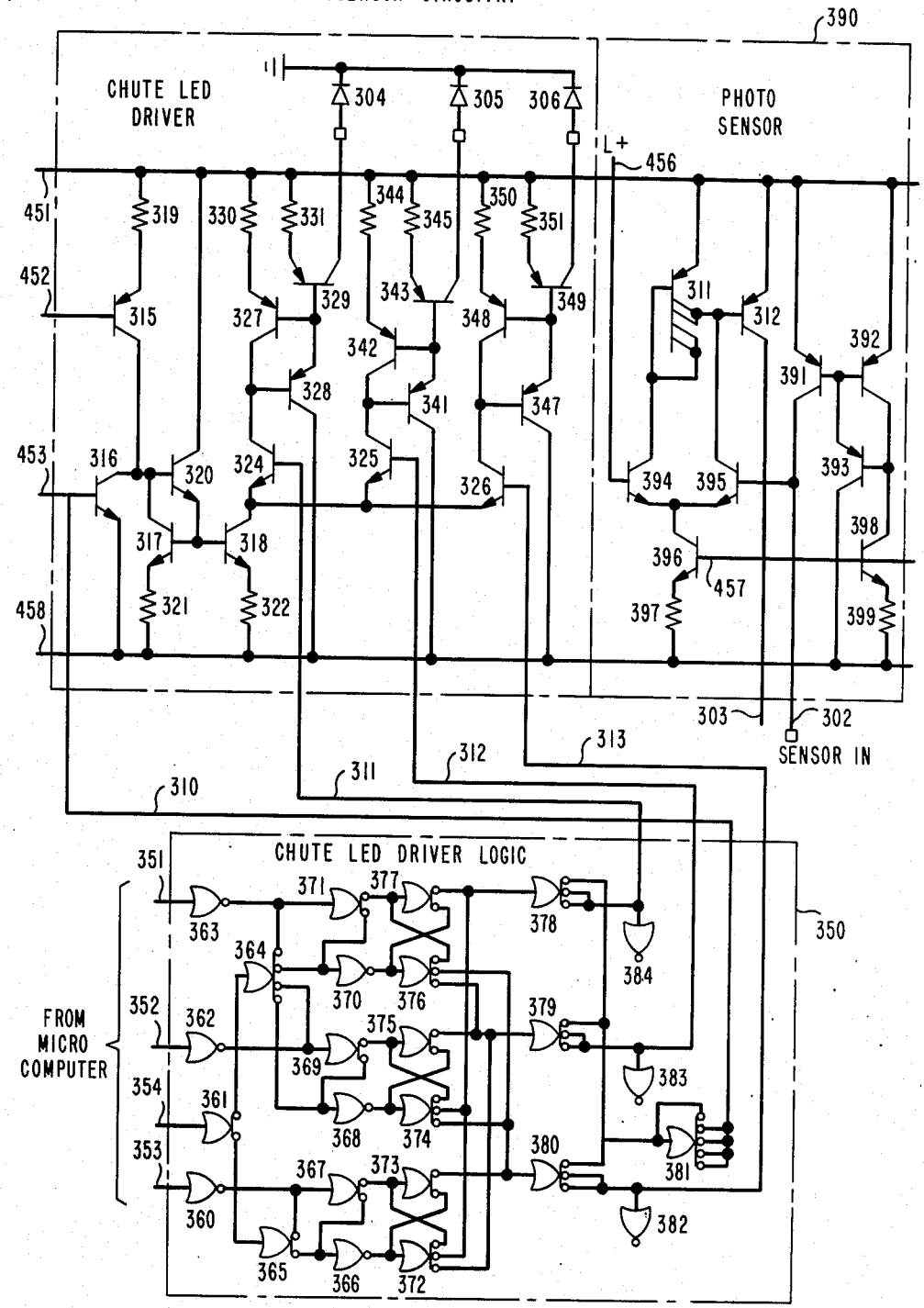
FIG. 3 is a detailed schematic of the LED driver and control logic photosensor circuitry employed in this invention.

Referring now to FIG. 3, the presence of coins within the chute is detected via three infrared LED-phototransistor pairs strategically located directly in the coin chute. By sequentially strobing the individual LEDs 304, 305 and 306, the coin-coming (CC) and coin-going (CG) LEDs 305 and 306 respectively provide the capability to determine when a coin is entering or leaving the chute. The hopper overflow (HO) LED 304, senses when the cash box is just beginning to overflow into the hopper.

The cycle time for strobing and reading an LED-phototransistor pair is normally every 10 ms. When a coin acceptor relay 120 is operated to accept a good coin, however, both the coin-going and the coin-coming LEDs 305 and 306 will be strobed in sequence every 10 milliseconds, each being separated by 700 microseconds. The microcomputer 110 writes a command word into the LED logic in order to begin the strobing/reading sequence. This instruction takes 64 milliseconds and within this time the appropriate LED is turned on. Another instruction, which takes another 64 milliseconds, is then executed by the microcomputer to give the appropriate phototransistor and associated circuitry time to settle. Via the microcomputer interface located in the circuitry logic 218, the output of the LED is then read and, subsequently, the selected LED is turned off.

The LED driver circuit requires four control inputs that are provided over leads 310, 311, 312 and 313, which also are the LED logic circuit outputs. The driver outputs, coin-coming, coin-going and hopper overflow, are each capable of sourcing 2.4 mA of current with a terminal voltage drop from 0 v to 2.45 v. The 2.4 mA current source is a result of multiplying the 10 milliamps current reference by two stages of current mirroring.

Figure 4:
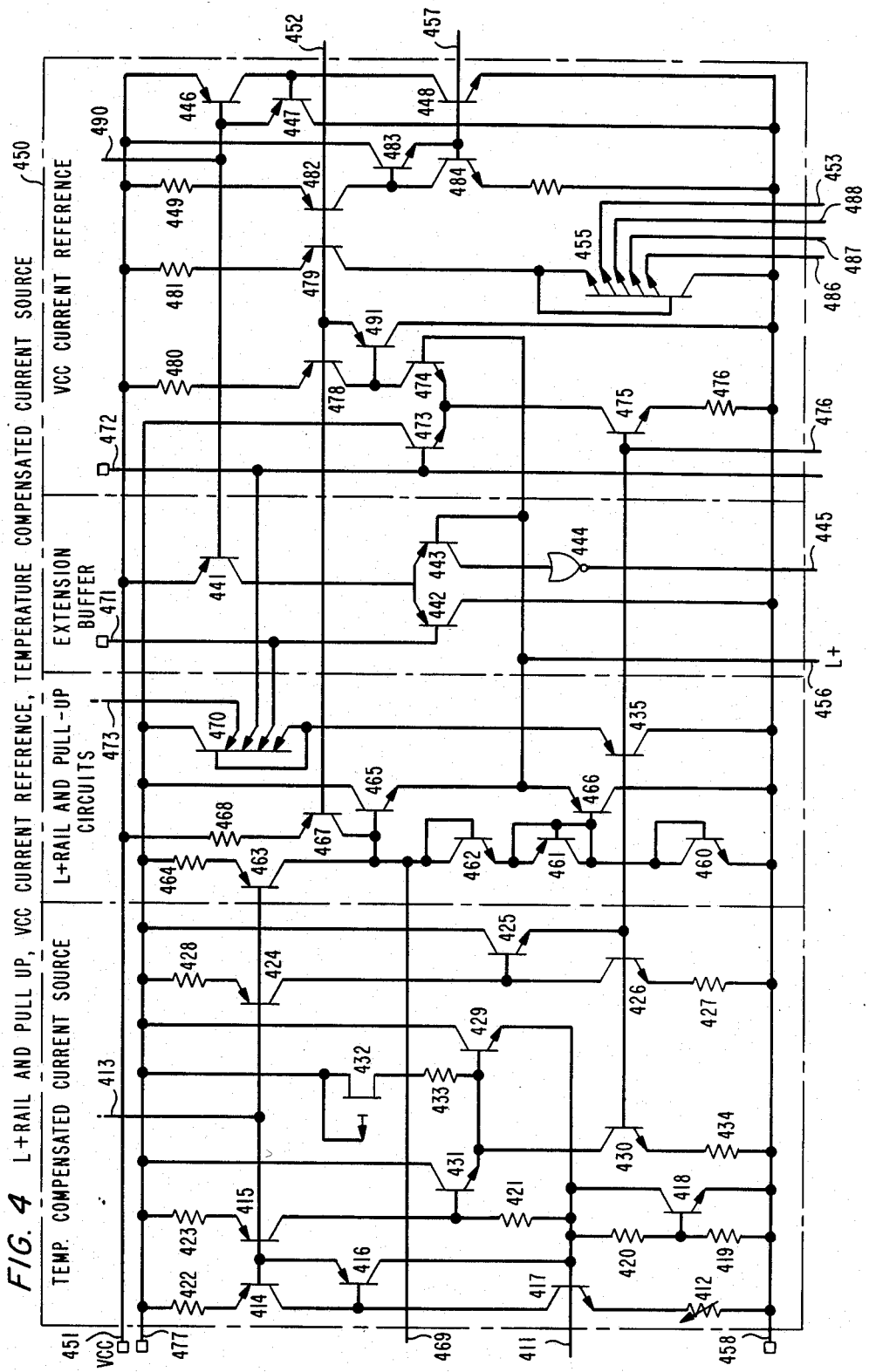
FIG. 4 is a detailed schematic of a current reference and temperature compensated current source employed in this invention.

Transistor 315 along with resistor 319 provides a 10 milliamps current source that is referenced from the VCC current reference circuit 450 shown in FIG. 4 via lead 452 and the VCC reference lead 451. If the control signal on lead 310 is high, transistor 316 is turned on to divert the 10 milliamps of current away from the current mirror comprising transistors 317, 318 and 320, and resistors 321 and 322, turning off all of the LEDs. If the control signal on lead 310 is low, transistor 316 is turned off via an active pull-down from transistor 455 located in the VCC current reference circuit 450. This pull down signal is provided over lead 453. The 10 milliamps is then mirrored by transistors 317 and 318 due to the mirror ratio. Transistors 324, 325 and 326 form a current steering mechanism. If the control signal on lead 311 is high, transistor 324 is turned on and the 60 milliamps of current is steered toward another current mirror consisting of transistors 327, 328 and 329, and resistors 330 and 331. The mirror multiplies the 60 milliamps by 20 outputting the resulting 2.4 mA of current out to the hopper overflow LED 304. Meanwhile, transistors 325 and 326 are turned off, blocking current from going into the other mirrors. If lead 312 is high while leads 311 and 313 are low, the current is diverted to the coin-coming output mirror circuitry comprising transistors 341, 342 and 343, and resistors 344 and 345. Similarly, if lead 313 is high while leads 311 and 312 are low, the current is diverted to the coin-going output mirror circuitry comprising transistors 347, 348 and 349, and resistors 350 and 351.

Control for the LEDs is provided through the chute LED driver logic circuit 350. LED control is in the form of three decoded data bits respectively provided over lines 351, 352 and 353 from the microcomputer 110. These data bits are latched on a write command by circuitry comprising gates 360 through 377 and then respectively provided to leads 311, 312 and 313 by gates 378, 379 and 380. The latching signal, also from the microcomputer 110, is provided over lead 354. The output of gate 381 is connected back to its input to limit the output to some predetermined value when it is high and hence override the active pull-down provided by gates 382, 383, and 384. These gates are phantom gates that act as current sources which can be saturated. These logic gates are powered from the L1 supply that is later described herein.

The photosensor circuit 390 is designed to sense the state of the phototransistors in the coin chute. Since the circuitry is arranged so that only one LED may be fired at any one time, all three phototransistor outputs may be tied together to reduce lead count. The phototransistors (not shown) are NPNs with their emitters tied to ground and collectors tied together to a sensor in lead 302. A current source comprising transistors 391, 392, 393, and 398 along with resistor 399 is used to pull the sensor in lead 302 up to the VCC rail 451 when all of the phototransistors are off. This current source can saturate up to the VCC reference level since no other current sources are connected to it. The switching input voltage on the sensor in lead 302 resides at a low level because of the connection to the L+ reference voltage on line 456. If one of the LEDs 304, 305 or 306 is fired without a coin present to block the light path, the associated phototransistor is turned on. This transistor will then sink the current provided by the current source, causing the sensor in lead to go low. A comparator comprisizing transistors 307, 308, 394, 395 and 396, and resistor 397, has the sensor in lead 302 as one of its inputs and is used to detect this condition. The output of the comparator is queried by the microcomputer to determine if a coin is present between the LED-phototransistor pair via lead 303. The comparator also has the L+ rail 456 (which is 2 VBEs over ground) as its reference. A logical one at the comparator output indicates that the phototransistor is off (coin blocking the light path).

Referring now to FIG. 4, there is shown a temperature compensated current source which provides a stable current reference 450 over the operating temperature range of the telephone set. The circuit is configured as a current source powered from lead 477 with this lead and lead 458 as inputs. A resistor 412 is used to initially adjust the output currents. Three outputs are provided by the current source. The output on rail 413 is an upper 10 milliamps base-current rail that is constant with temperature. This rail is used in the L+ circuit, the fraud filter, and its associated logic circuit, and the transmit control circuit. The output on rail 476 is a lower 10 milliamps base-current rail that is constant with temperature. This rail is used in the VCC current reference circuit and the transmit control circuit. The output on rail 411 is a lower 10 milliamps current base rail that is ratioed to a silicon resistor which is temperature dependent. This rail is used in the coin acceptor current source circuit.

The current source is formed by transistors 414 through 418 and resistors 419 through 423. Transistors 414 and 415 form a current mirror of 10 milliamps and 50 milliamps respectively with transistor 416 serving as a base current helper. Transistor 418 combines with resistors 419 and 420 to form a VBE multiplier. The voltage developed across resistor 412 is the difference between the collector voltage of transistor 418 and the VBE of transistor 417 and is designed to be 200 mV. By properly selecting the current densities, VBE multiply ratio, and emitter areas of transistors 417 and 418, the voltage developed across resistor 412 is temperature independent. This current is reflected up to transistor 414 and establishes rail 476 by using transistors 424, 425, and 426, and resistors 427 and 428 to mirror the upper 10 milliamps current rail.

Proper start-up of the temperature compensated current source is insured by a starter circuit consisting of transistors 429, 430, 431 and 432, and resistor 421. Transistor 432, a FET operating as a pinch resistor, and transistor 429 bias the current source to turn on when the rail 477 goes above 1.6 v. Initially, transistors 430 and 431 are biased off. When the current source turns on, transistor 430 turns on, diverting base current from transistor 429 causing it to turn off. As a result, the starter circuit is removed from the current source. Transistor 431 and resistor 421 provide the additional current required by transistor 425 to prevent it from going into saturation.

The L+ supply circuit provides the L+ voltage rail on line 456, which is two VBEs above the R' reference on line 458. This L+ voltage rail serves as the positive reference for the logic and as a reference voltage for other circuits. When the coin processing circuitry is disabled by the microcomputer, very little current is required by the L+ rail. When the circuitry is enabled, however, all of the logic in the circuitry will draw its current from the L+ rail. The L+ rail is established by driving a string of diodes, 460, 461 and 462 by a current source, transistor 463 and resistor 464, setting up a 3 VBE rail. Transistors 465 and 466 form a push-pull pair to buffer the output and also perform the level shift from 3 VBEs to 2 VBEs, establishing the L+ rail on line 456. To provide the current demand when the coin processing circuitry is enabled, an additional amount of base current is provided to transistor 465 by an additional current source, transistor 463 along with resistor 464, which is turned on only when the main logic of the coin processing circuitry is turned on. The reference voltage on line 469 limits the L+ rail to turning on only when the VCC voltage exceeds a predetermined threshold.

Transistor 470 is a multi-use active pull-up device consisting of multiple-emitters. It is a current source driven PNP transistor operating in the reverse mode. The outputs are independent such that each can be active or saturated without affecting the other outputs. The pull-ups are used in three circuit sections and connected according to the following leads: the extension buffer on lead 471, the VCC current reference on the external power enable lead 472, and the fraud filter logic on the FF lead 473.

The VCC current reference circuit provides a switched current reference and an active pull-down circuit to other circuits of the coin processing circuitry. The circuit utilizes the current reference, on lead 476, that is developed by the temperature compensated current source and steers the current into the output current rail when the input on lead 472 is low. The steering circuit consists of transistors 473, 474 and 475 and resistor 454. Transistor 475 serves as a current source referenced from lead 476 and transistors 473 and 474 form a comparator with L+ as its voltage reference. If the voltage level at the external power enable lead 472 is greater than L+, the current is steered to lead 477. If, on the other hand, the voltage on the external power enable lead 472 is less than the voltage on the L+ lead 456, the current is steered into transistors 478 and 479 and their associated resistors 480 and 481, turning on the output rail 452. This rail turns transistor 467 on to increase the base current of transistor 465 which sets up the L+ rail due to the increased load on L+. The output rail 452 also powers the L1, L2, and L3 logic supplies through transistors 482, 483 and 484. The current reference, lead 452, used by an initial rate relay driver discussed later herein, and the chute LED driver is also enabled.

The active pull-down circuit in the VCC current reference is similar to the pull-up circuit as previously described in the L+ rail section. The pull-down circuit ensures that the transistors in the initial rate logic and LED drivers remain off until they are turned on by the appropriate logic.

In order to accept or reject coins deposited by a customer in making a telephone call, a coin acceptor solenoid, actuatable by coin acceptor circuits, is located in the the coin chute of the telephone set as part of the coin relay 120. The coin acceptor circuits provides a current source for charging a capacitor (not shown) up to a predetermined voltage at which a voltage sensor sets a status bit, indicating to the microcomputer 110 that the coin acceptor voltage is ready. When the microcomputer 110 decides to accept a coin rolling down the chute, it reads the status bit to see if the coin acceptor circuitry is ready or not. If it is ready, then the microcomputer writes the appropriate data word into the coin acceptor logic, closing a transistor switch which connects the capacitor and the coin acceptor coil. This is achieved by saturating the switch with another current source which, in turn, results in discharging the capacitor through the switch and into an operate (CAO) coil of the coin acceptor relay 120, increasing the coil current as the flux within the coil builds up.

Once the coil has operated, the microcomputer 110 then times for 100 milliseconds to insure that the armature on relay 120 has operated. The microcomputer 110 then writes another data word into the coin acceptor logic to disconnect the capacitor from the coin by turning the switching transistor off. A third current source is then turned on to hold the coin acceptor solenoid in the closed position for a holding period via a coin acceptor hold lead (CAH). When the microcomputer decides to release the coin acceptor solenoid, another data word is written into the coin acceptor logic to turn off the holding current source and turn on the charging current source. The depleted capacitor is then charged back to full charge and is ready for the next cycle.

Figure 5:
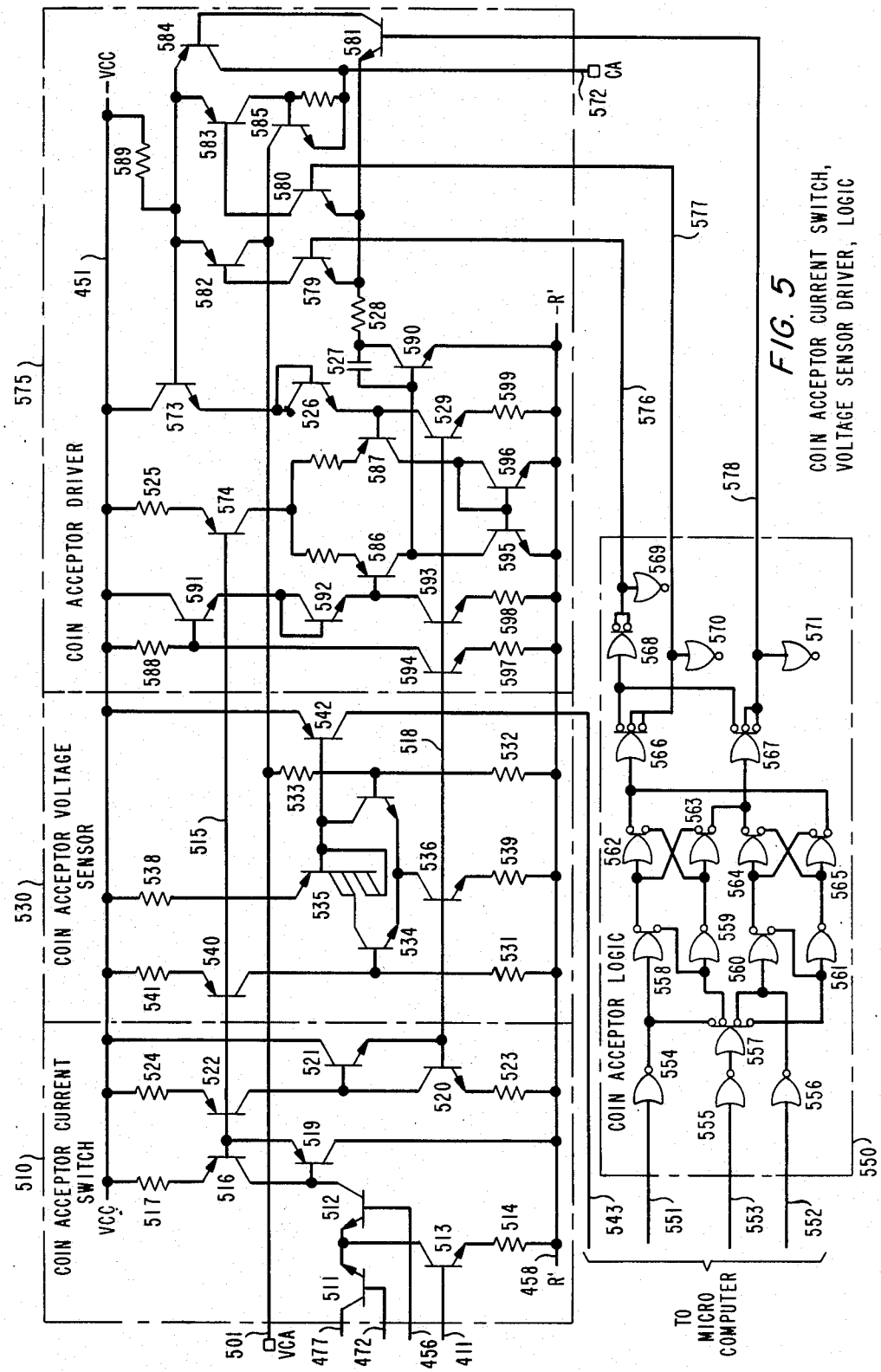
FIG. 5 is a detailed schematic of the coin acceptor circuitry employed in this invention.

Referring now to FIG. 5 and the coin acceptor circuitry in greater detail, this circuitry consists of four basic sections: a coin acceptor current switch 510, a voltage sensor and reference, a coin acceptor logic section, and a coin acceptor driver.

The coin acceptor current switch 510 establishes a switchable current source used as a reference by the other coin acceptor circuits. The switch inputs are VCC on rail 451, external power enable lead 472, the L+ rail 456, and the temperature dependent reference on lead 411. The circuit utilizes transistors 511, 512, and 513, and resistor 514 in a similar manner as the current steering circuit of the VCC current reference circuit and provides an output current source reference rail 515. When the external power enable voltage level on lead 472 is greater than the L+ voltage on lead 456, the current is steered to lead 477. If, on the other hand, it is less than the L+ level, then the current is steered to transistor 516 and resistor 517 to establish the output current rail 515. The circuit current outputs are an upper and lower current base rail, 515 and 518, which are temperature dependent as required by the coin acceptor driver section.

The coin acceptor voltage sensor 530 senses the coin acceptor capacitor voltage, scales its value appropriately, and compares the scaled level with a voltage reference. The voltage reference is a function of the ratio of two silicon resistors 514 and 531, resulting in a temperature independent reference. Resistor 531 shares its current leg with transistor 540 and resistor 541. A resistor divider, resistors 532 and 533, is provided for sensing the coin acceptor capacitor voltage. And a comparator comprising transistors 534 through 537 and resistors 538 and 539, compares the reference voltage with the capacitor voltage, which is provided to the capacitor via lead 501. If the coin acceptor capacitor voltage is greater than 2.5 v, the base voltage of transistor 537 is higher than the base voltage of transistor 534, causing transistor 542 to turn on (logic one). The state of this transistor is readable by the microcomputer 110 via lead 543.

The coin acceptor logic section 550 obtains two data bits over leads 551 and 552 from the microcomputer 110, latches them with lead 553 and decodes them with the circuitry comprising gates 554 through 568 to obtain the coin acceptor driver control lines 576, 577, and 578. Gates 569, 570 and 571 form active pull-downs for the three outputs to insure that transistors 579, 580, and 581 are off when the logic output is low.

The coin acceptor driver section 575 provides two functions: (1) a current source to be steered by BIL logic gates, and (2) an adequate switch to transfer the energy stored in the coin acceptor capacitor to the coin acceptor coil. The first function is achieved by using an operational amplifier operating as a voltage follower with a current sensing resistor at one input to regulate the output current and a stable reference voltage at the other input. Transistor 585 performs the second function by acting as a switch between the capacitor and the coin acceptor coil.

Transistors 586 and 587 form the input differential pair of the operational amplifier. The reference voltage is generated between VCC on rail 451 and the positive terminal of the operational amplifier by driving a silicon-based current source into a silicon resistor, 588. On the other side of the differential pair, a thin film resistor 589 in series with the current output path is used to develop another differential voltage between VCC on rail 451 and the negative terminal of the operational amplifier. The operational amplifier is configured such that the voltage across resistor 588 will equal the voltage across resistor 589, a fixed, stable voltage. If the output current is decreased, the voltage across resistor 589 decreases. This will increase the base voltage of transistor 587, causing an increase in current drive to transistor 590, which, depending on the logic, will increase the base drive of transistor 582, 583, or 854. The output current will then increase until the two differential voltages match again.

The coin acceptor logic is provided to selectively activate current sources. Since three equal valued current sources are required and each turned on and off at different times, a steering mechanism is used to switch each current source appropriately. The three logic outputs, lines 576, 577, and 578 are used to steer the currents. Only one of the logic outputs can be high at a time. Line 576 is high only during the capacitor charging period, line 577 during the operate period, and line 578 during the hold period. The logic control lines control transistors 579, 580, and 581 respectively, turning each one on and off. The three required outputs are established at the collectors of transistors 582, 583, and 584. Transistor 585 functions as a switch and supplies 35 mA of current at a VCESAT less than 100 mv with a base drive current of 4.7 mA.

Figure 6:
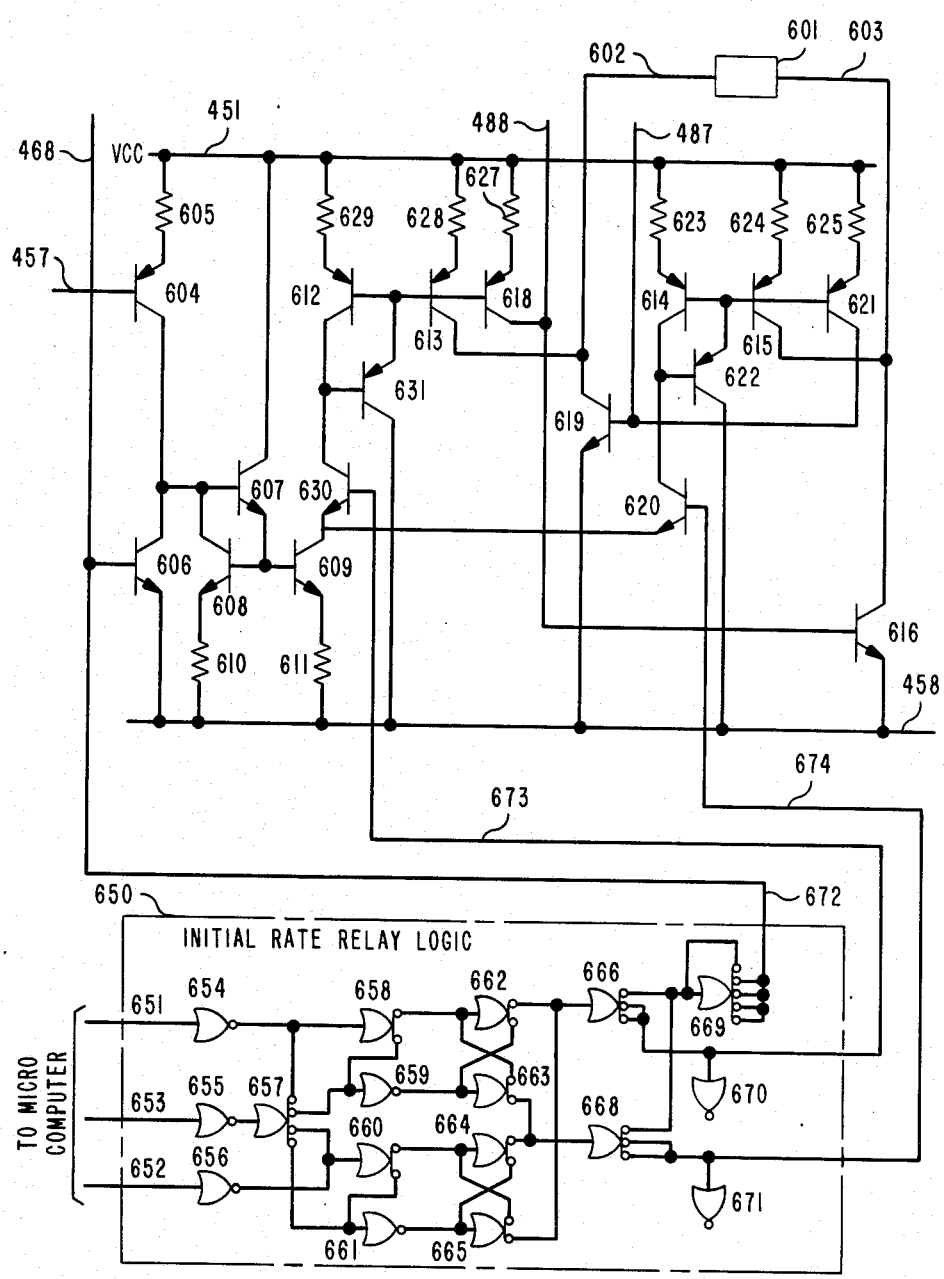
FIG. 6 is a circuit diagram of the initial rate logic and driver employed in this invention.

Referring now to FIG. 6, there is shown an initial rate (IR) circuit suitable for providing the logic and driver required to set and reset a magnetically latching initial rate relay 601. If sufficient current is driven from the initial rate set lead 602 to the initial rate reset lead 603 for a required time period, the relay 601 sets. Conversely, if the current is driven from the initial rate reset lead 603 to the the initial rate set lead 602, the relay 601 resets.

The initial rate relay logic 650 latches two data bits respectively received on leads 651 and 652 from the microcomputer 110 and decodes them via gates 654 through 671 into three control signals on leads 672, 673 and 674. These control signals are used by the initial rate driver circuitry. The latching signal from the microcomputer 110 is provided to the initial rate relay logic over lead 653.

The initial rate driver takes the current reference on lead 457 from the VCC current reference circuit 450, and multiplies it through two stages of current mirror to achieve the desired output current at the initial rate set lead 602 or the initial rate reset lead 603. The current source is formed by a transistor 604 and a resistor 605. A switch 606, controlled by the initial rate logic signal on lead 672, disables or enables the driver. When lead 672 is high, the current flows through transistor 606 to the ground reference potential 458. If lead 672 is low, transistor 606 is off, and the current is steered toward the current mirror made up of transistors 607, 608 and 609, and resistors 610 and 611 resulting in a six to one multiplication. This increased current is then steered up to the mirror pair of transistors 612 and 613, or to the mirror pair of transistors 614 and 615, depending on the state of the control signals on leads 673 and 674. If lead 673 is high and lead 674 is low, the increased current is steered toward transistors 612 and 613 where another multiplication factor of 17 occurs. The result is a further increase in the output current at the initial rate set lead 602. At the same time, transistor 618 sources current to transistor 616, saturating it, thus grounding the initial rate reset lead 603. This completes the current path and the relay is set. Transistors 619, 620, 614, 615, 621, and 622 are off since at this time there is no current flow through them. The microcomputer times for 10 milliseconds before opening the circuit to insure setting of the relay 601. Once set, power is removed from the relay and the state of the relay will remain unchanged until it is reset.

When resetting the relay, lead 673 is low and lead 674 is high. The increased current now flows to the current mirror formed by transistors 614 and 615, steering current to the initial rate reset lead 603. Also, transistor 619 is turned on, thus grounding the initial rate set lead 602 and completing the current path.

Figure 7:
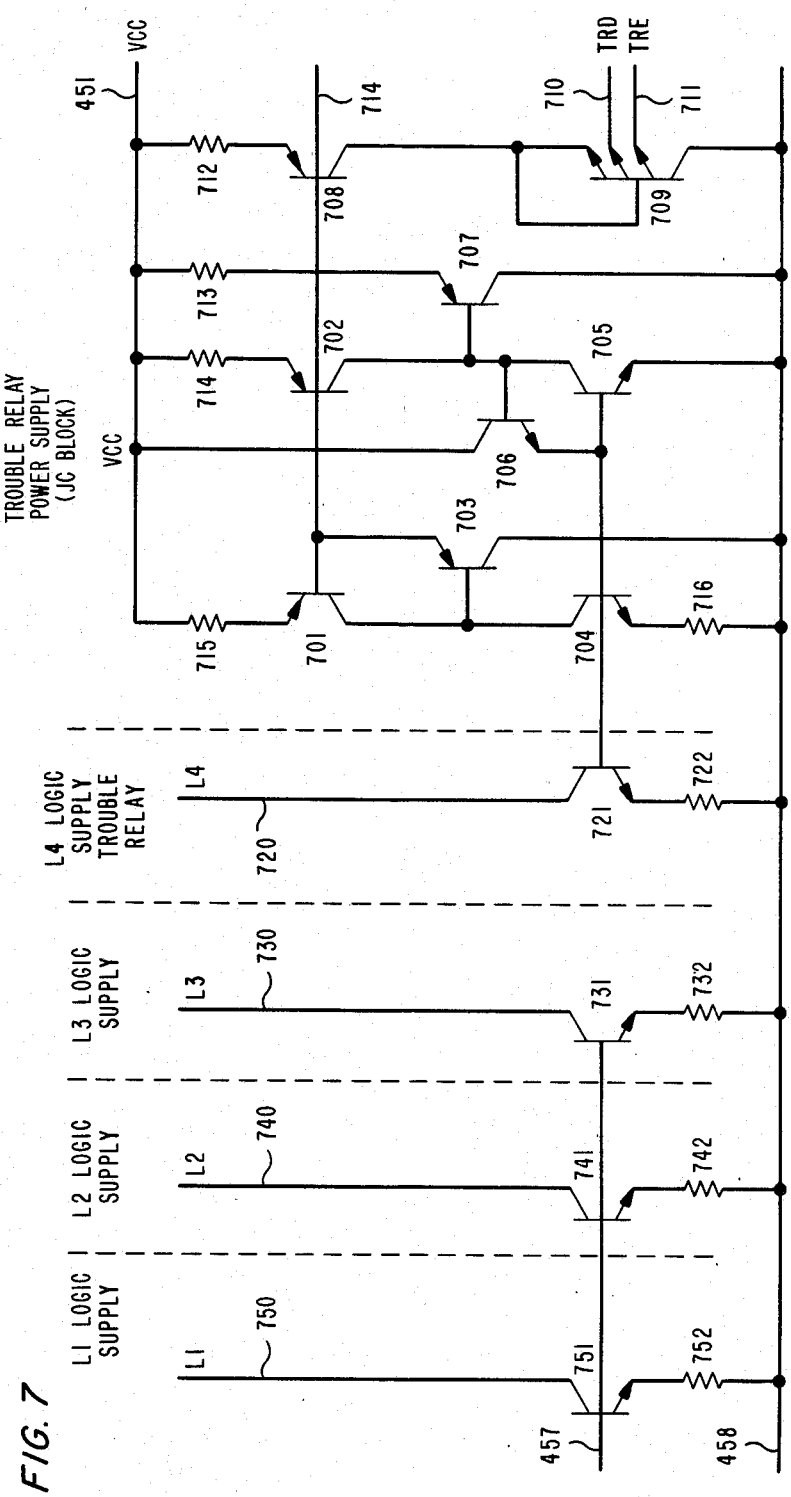
FIG. 7 is a circuit diagram of four logic supplies employed in this invention.

Four logic supplies as shown in FIG. 7 are associated with the coin processing circuitry. The L1, L2, and L3 logic supplies provide different current densities for powering the main logic which works at different logic speeds. The L4 logic supply provides power for the trouble relay 801.

The L1 logic supply establishes the logic power for the BIL logic that must be alive during a loop interruption. This includes establishing a voltage rail of two $V_{BE}$'s (L+1) and a current source for the BIL gate injectors. This rail powers part of the state control and part of the active network control logic circuit. It is on at all times when the VCC voltage is above three $V_{BE}$'s.

The L2 logic supply powers the clock circuitry and part of the state control. It is turned on only during the periods where the state control has determined that there is enough power or when the microcomputer requires an active clock.

The L3 logic supply is powered from the active network internal power supply, VD, instead of VCC. This rail is used by the majority of the remaining logic such as the tone circuitry, the software timers and the microcomputer interface. This power rail is turned on only when loop power is present and when VCC is above the upper threshold.

The trouble relay power supply establishes a current reference for the trouble relay circuits. The current reference is achieved by a current source within the VCC rail consisting of transistors 701, 702, 703, 704, 705, and 706. This current source does not require the high degree of stability required of the main temperature compensated current source since very little logic is powered from this current source. In addition, the relay is set during a period when extra power is available. Since the current source lives during the sleep period, when loop power disappears, a simple circuit is desired to minimize power consumption.

Transistor 707 is a simple starter that starts the current source when the VCC rail 451 has surpassed 3 VBEs. Transistors 708, and 709 form active pull downs. The active pull-down transistor 709, is a multiple emitter, current source operating in the reverse mode. Outputs are independent such that each can be active or saturated without affecting the other outputs.

Figure 8:
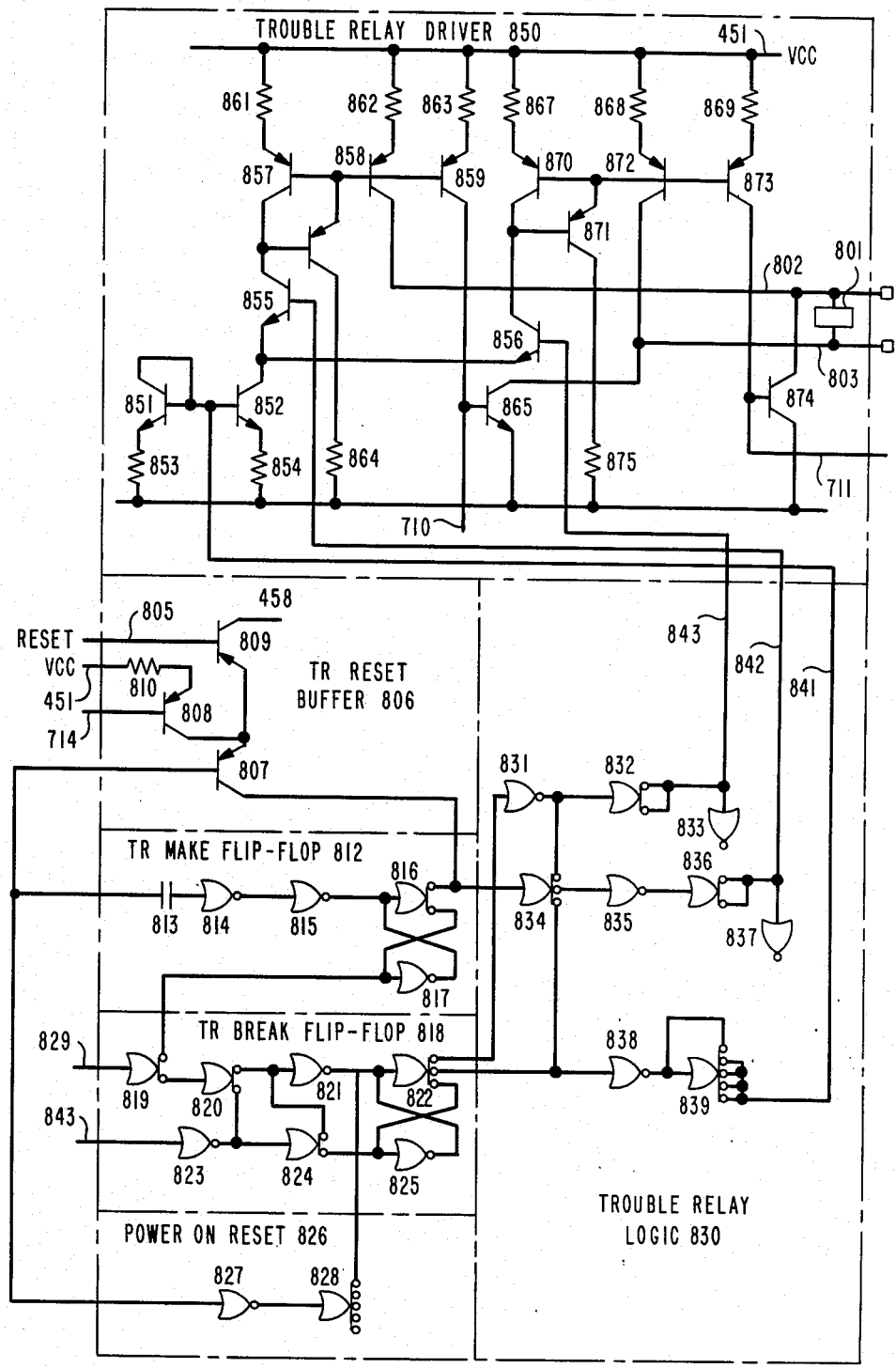
FIG. 8 is a circuit diagram showing the trouble relay circuitry employed in this invention.

Referring now to FIG. 8, there is shown trouble relay (TR) circuitry used to provide an indication to the central office when the telephone set is not operating properly because of a faulty coin chute or the microcomputer electronics. The trouble indication is observable by the central office when a stuck coin test is made. When the trouble relay 801 is operated, a current path is provided around the coin relay. If a stuck coin test is made by the central office, a stuck coin indication results. The central office attempts to collect or refund the coin and retest the coin relay. But since the trouble relay 801 permanently closes the path, the stuck coin test always fails and after a number of attempts, the central office flags the coin telephone as faulty, and a repair person is sent to service the phone. The trouble relay 801 is identical to the initial rate relay 601, resulting in similar driver circuits. The trouble relay has two leads, 802 and 803. If current is driven from the lead 802 to the lead 803, the relay 801 sets. Conversely, if current is driven from the lead 803 to the lead 802 the relay resets.

The trouble relay circuits consist of an input buffer 806, comprising transistors 807 through 809 and resistor 810, for lead 806 from the microcomputer, a trouble reset make flip-flop 812, a trouble reset break flip-flop 818, a power-on reset circuit 826, trouble relay logic 830 and the trouble relay driver 850. The trouble reset make flip-flop 812 comprises a capacitor 813 and gates 814 through 817. The trouble reset break flip-flop 818 comprises gates 819 through 825. The power on reset circuit 826 comprises gates 827 and 828 and the trouble relay logic 830 comprises gates 831 through 839.

The trouble reset make flip-flop 812 is powered from the L4 power supply and is initially reset via the power-on reset circuit when VCC on lead 451 crosses the 3 VBE transition. The make flip-flop output is ANDed with the output of the input buffer 806. If the lead 805 is low at this time, the trouble reset driver logic, also powered from the L4 logic, sets the trouble relay 801. When the lead 805 goes high, the trouble relay driver is turned off and the relay remains set. At the same time, the microcomputer 110 becomes active and starts checking the entire system. If no faults are found, the microcomputer 110 resets the trouble relay by writing a one into the trouble reset break flip-flop 818 via lead 829. This action also sets the trouble reset make flip-flop 812, inhibiting further settings of the trouble relay when the lead 805 goes low during a loop interruption occurring within the remaining period of the call. The trouble reset make flip-flop 812 remains set until VCC on rail 451 dips below 2 $V_{BE}$s and the the logic no longer functions. The output of the trouble rest break flip-flop 818 resets the trouble relay through the trouble relay logic and driver circuits 830 and 850, which gives sets priority over resets.

The trouble relay driver is controlled by the driver logic output lines 841, 842, and 843. Line 841 is the output of gate 839 which is configured as a current source. The gate's output current becomes a reference for the trouble reset driver output current. Lines 842 and 843 are the control signals which respectively set and reset the trouble relay 801. The relay is set when the lines 841 and 842 are high and reset when lines 841 and 843 are high.

The trouble relay driver is very similar to the initial rate relay driver previously described. The output on line 841 from the trouble relay logic is used as a current source which is multiplied by a factor of ten through the current mirror comprising transistors 851 and 852, and resistors 853 and 854. The resulting increased current is steered by transistors 855 and 856 to one of two mirrors. If line 842 is high, then transistor 855 is on, causing the 100 milliamps to flow into the current mirror, comprising transistors 857, 858, 859, and 860, and resistors 861 through 864. This current mirror multiplies the increased current by a factor of 20, this latter current being applied to the lead 802. Transistor 865 is saturated by transistor 859, thus completing the current path.

Other circuits are also in the coin processing circuitry. One such circuit is a transmitter control circuit which includes an active filter circuit to prevent Red Box Fraud. The circuit is composed of a preamplifier, a switched input amplifier and a fraud filter (FF). The transmit control's basic function is to provide two controllable transmission channels. One channel includes the fraud filter circuit while the other bypasses it with the default state being the bypassed channel.

The fraud filter comprises an active band reject filter designed to reject one of the dual frequency coin tones (2200 Hz) which may be introduced, via the transmitter, for fraudulent purposes. A STAR (Standard Tantalum Active Resonator) filter is used, although any filter providing the desired band-pass response is suitable for such use.

Through the transmit control, the microcomputer selects the transmit channel which includes the fraud filter for transmitting whenever polarity is positive, a condition occurring whenever the central office is expecting coin deposits. When loop polarity is negative, the bypassed channel is selected. Fraud filter logic is required to control the inserting of the fraud filter in series with the speech path.

Figure 9:
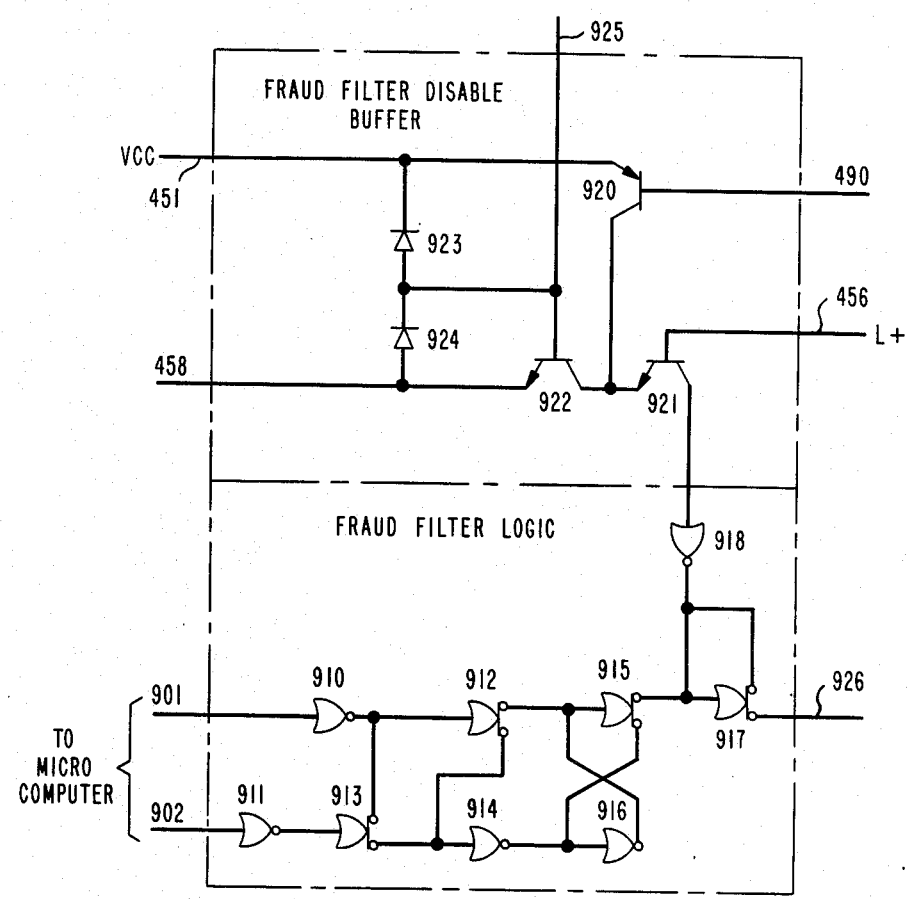
FIG. 9 is a circuit diagram of the fraud filter logic and fraud filter disable buffer circuitry employed in this invention.
Figure 10:
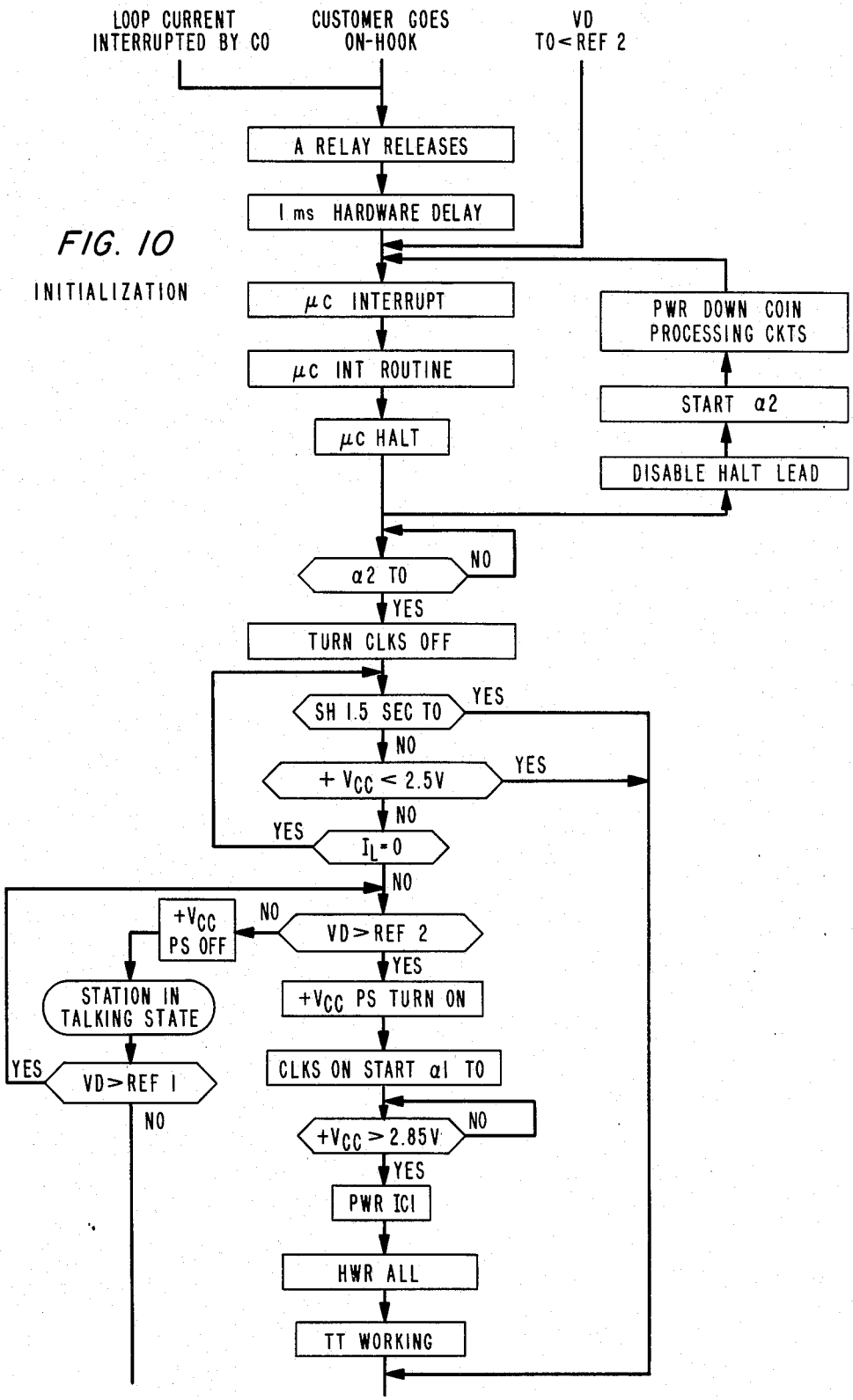
Figure 11:
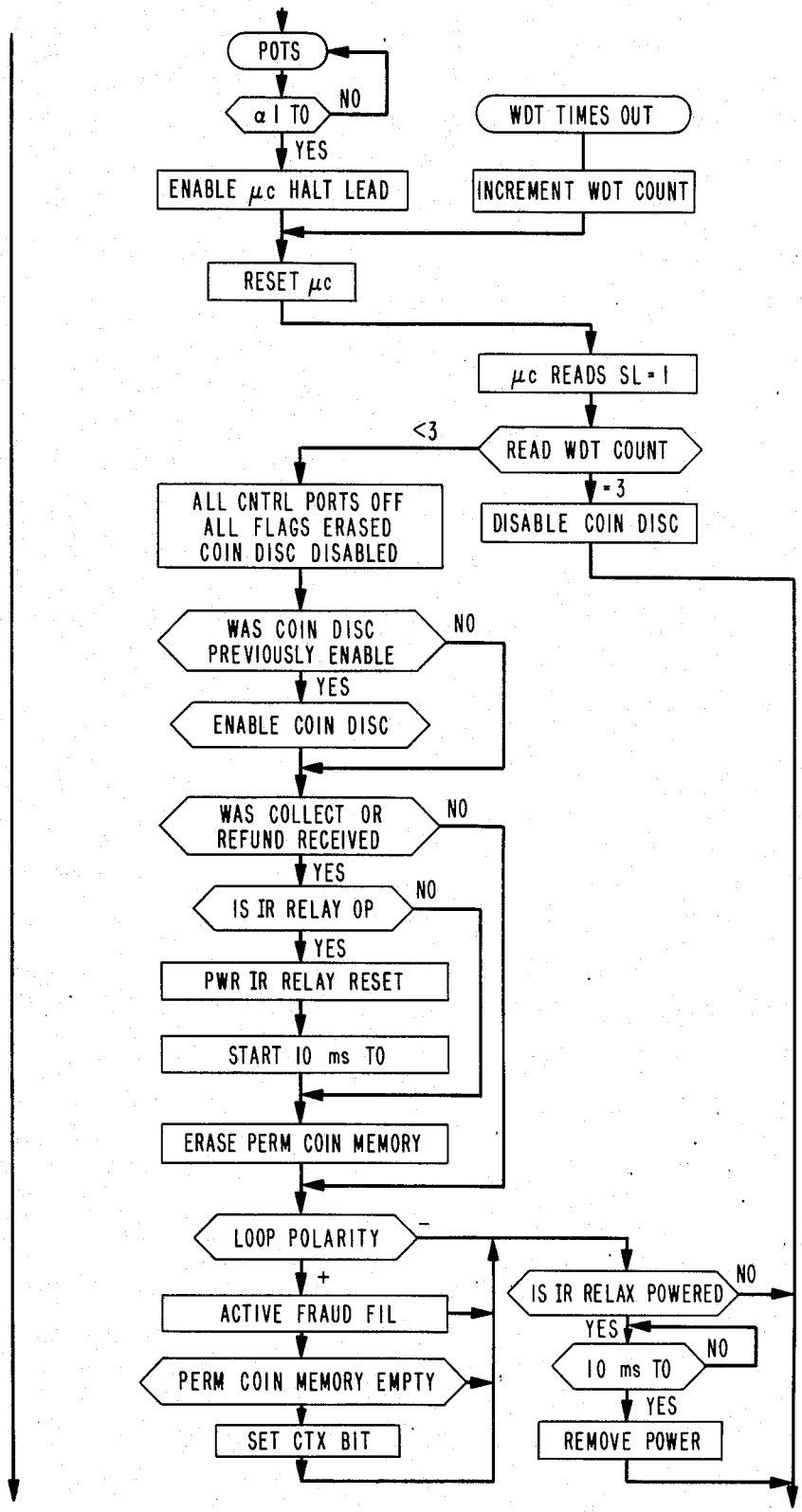
Figure 14:
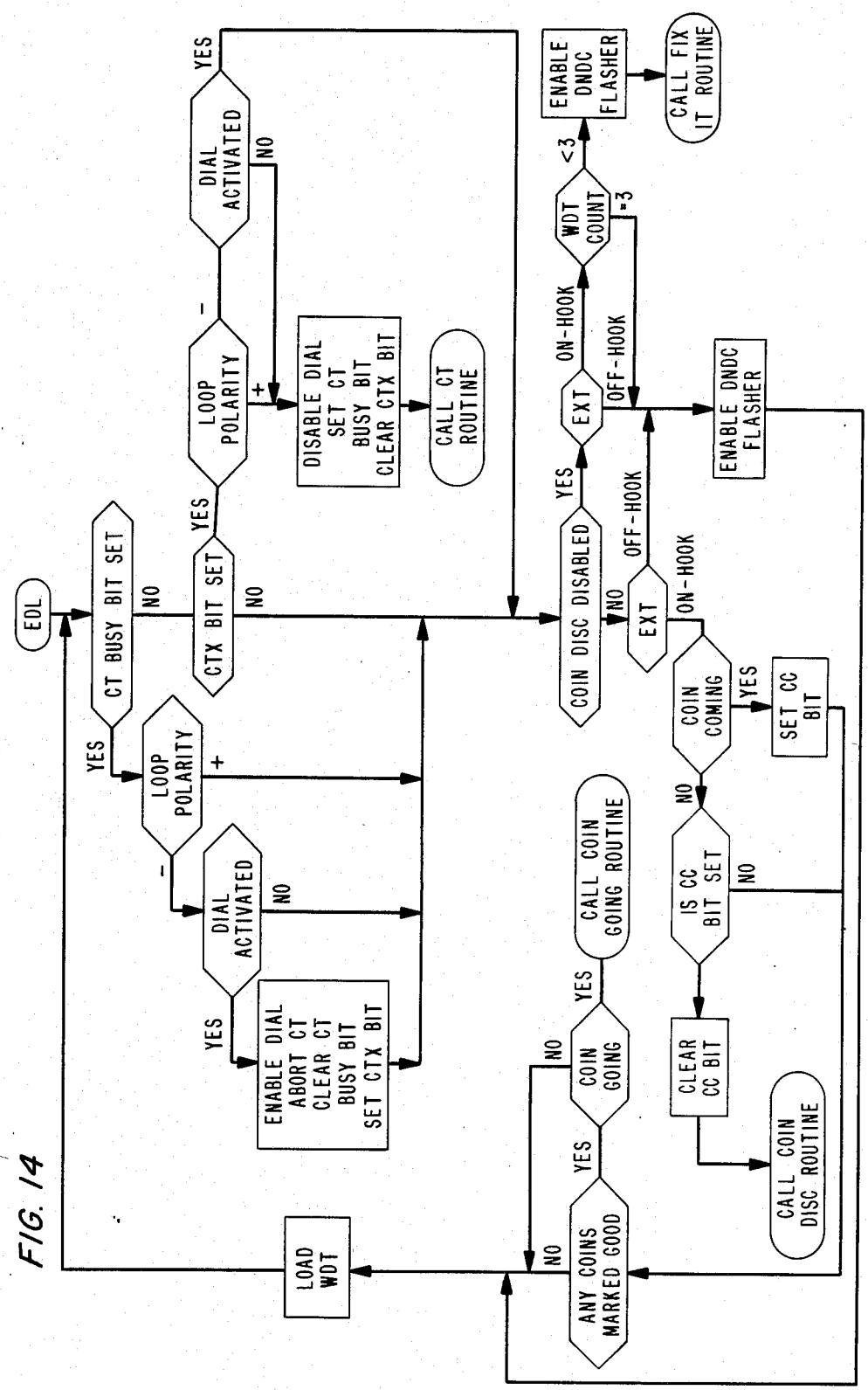
Figure 15:
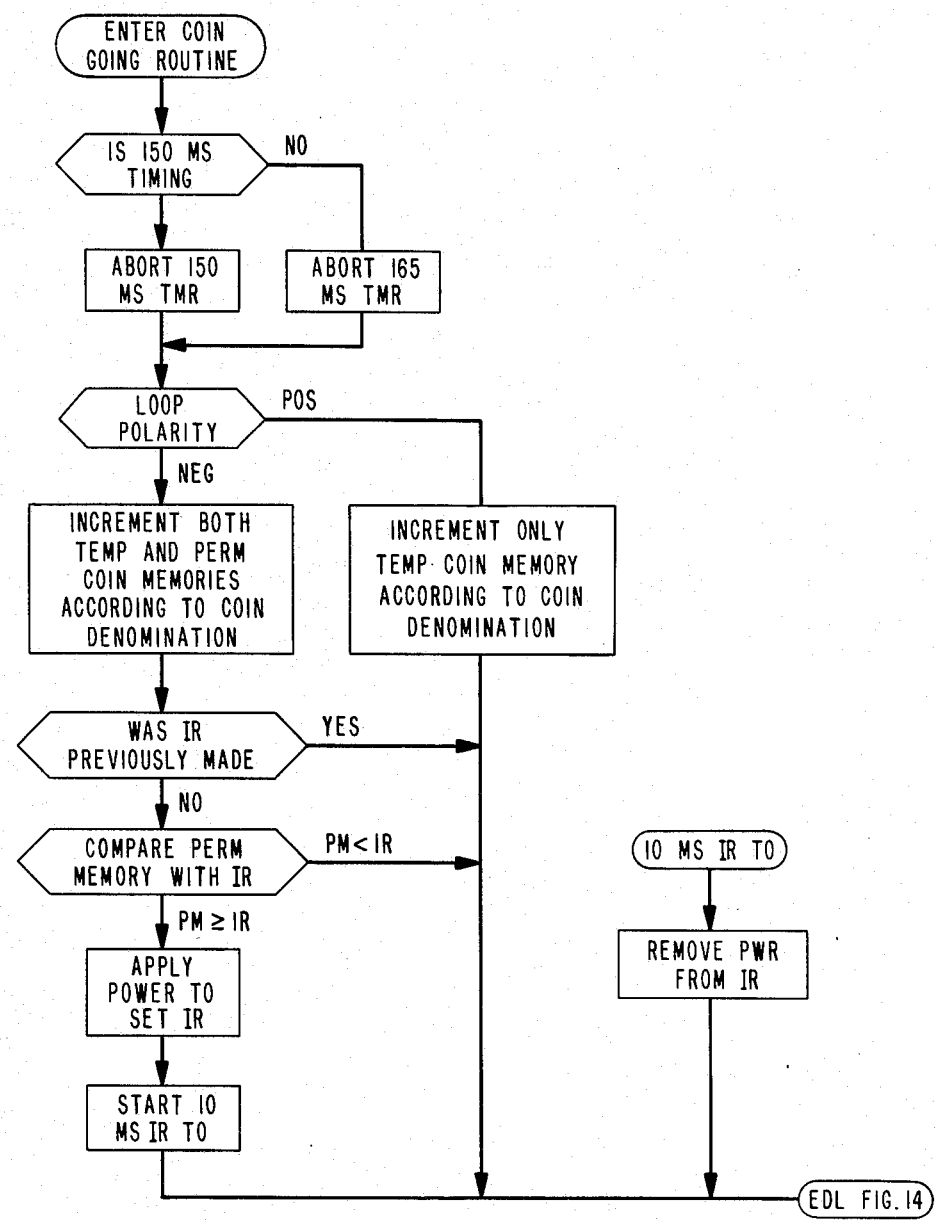
Figure 16:
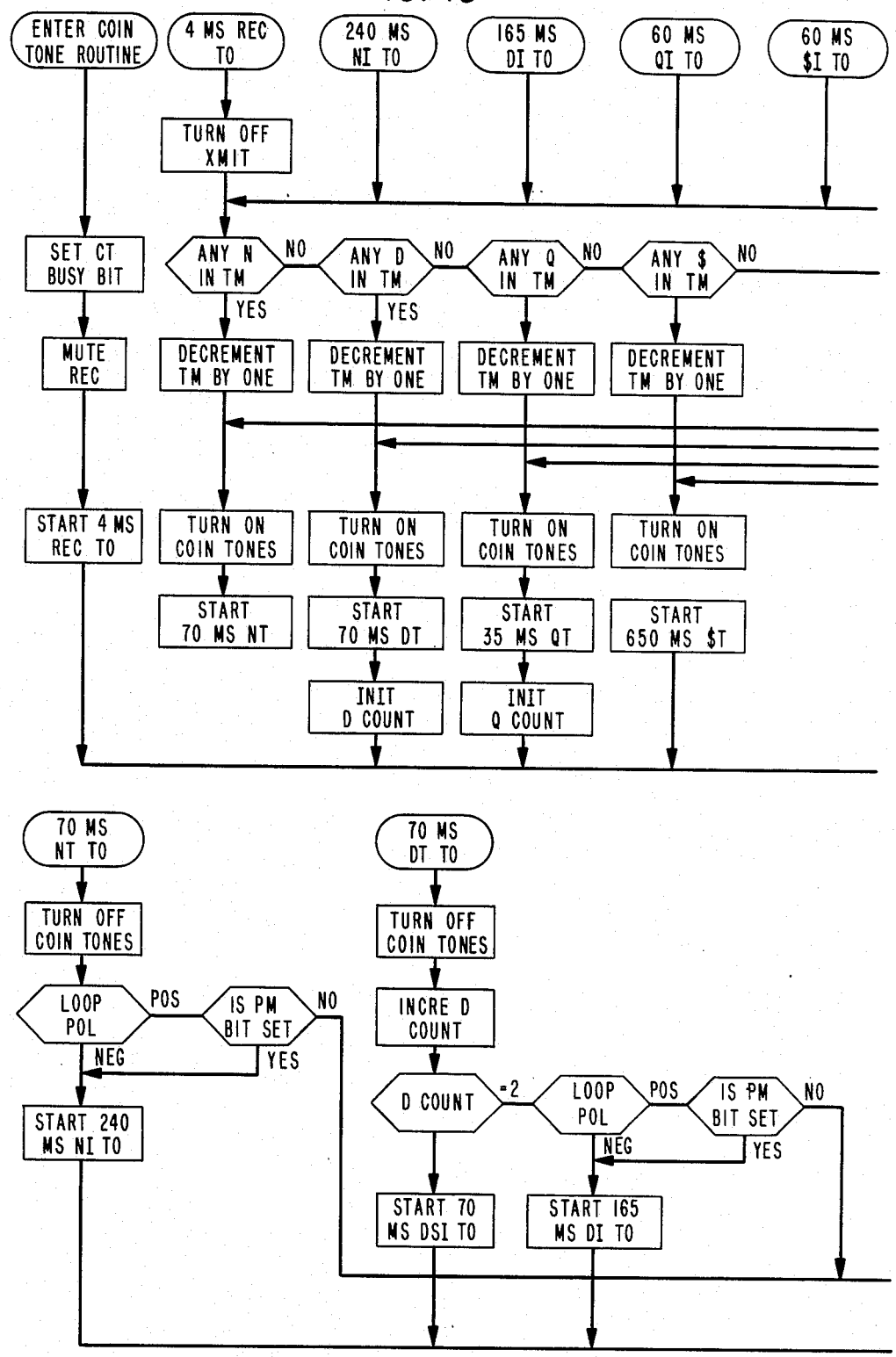
Figure 17:
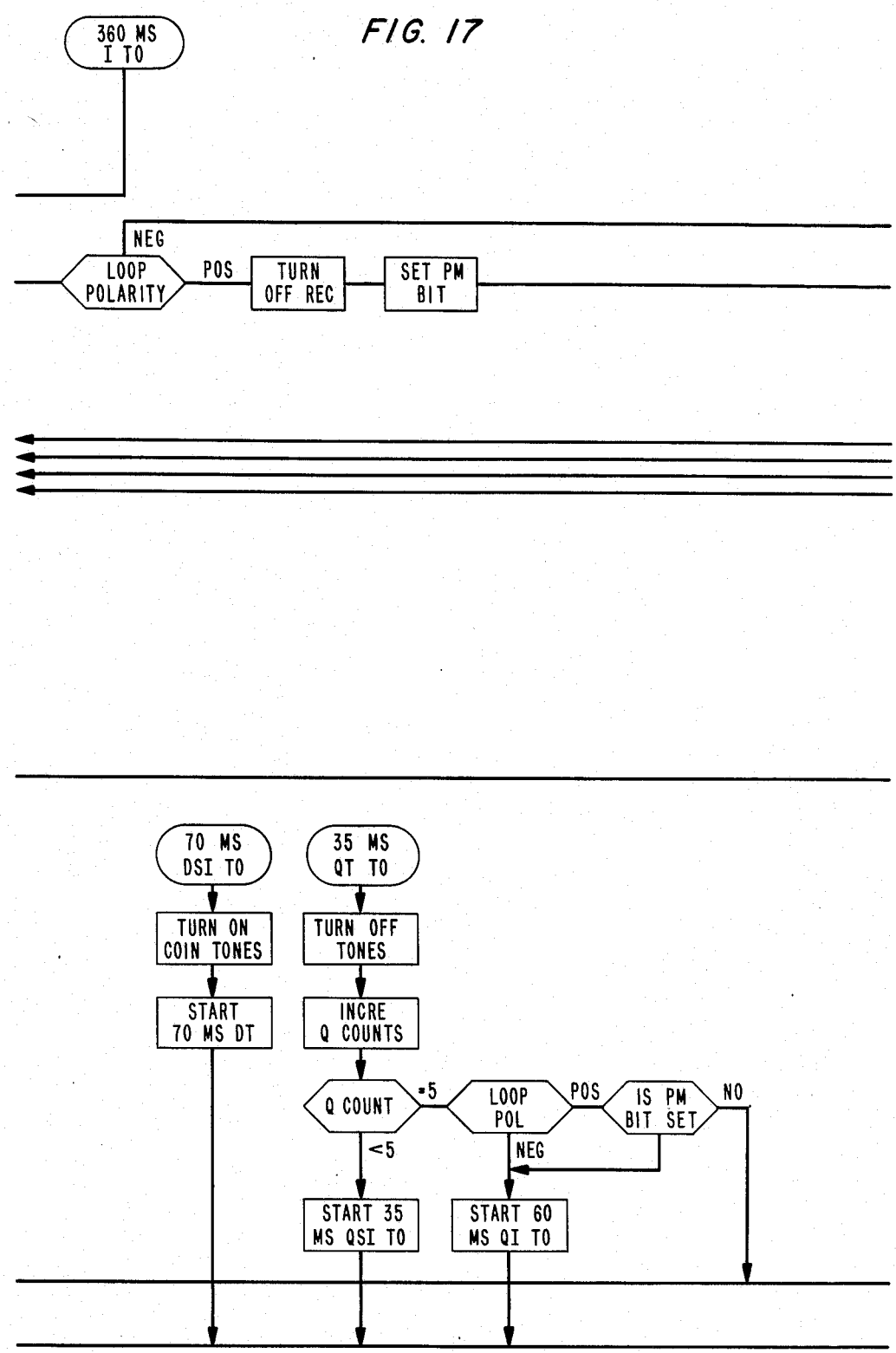
Figure 18:
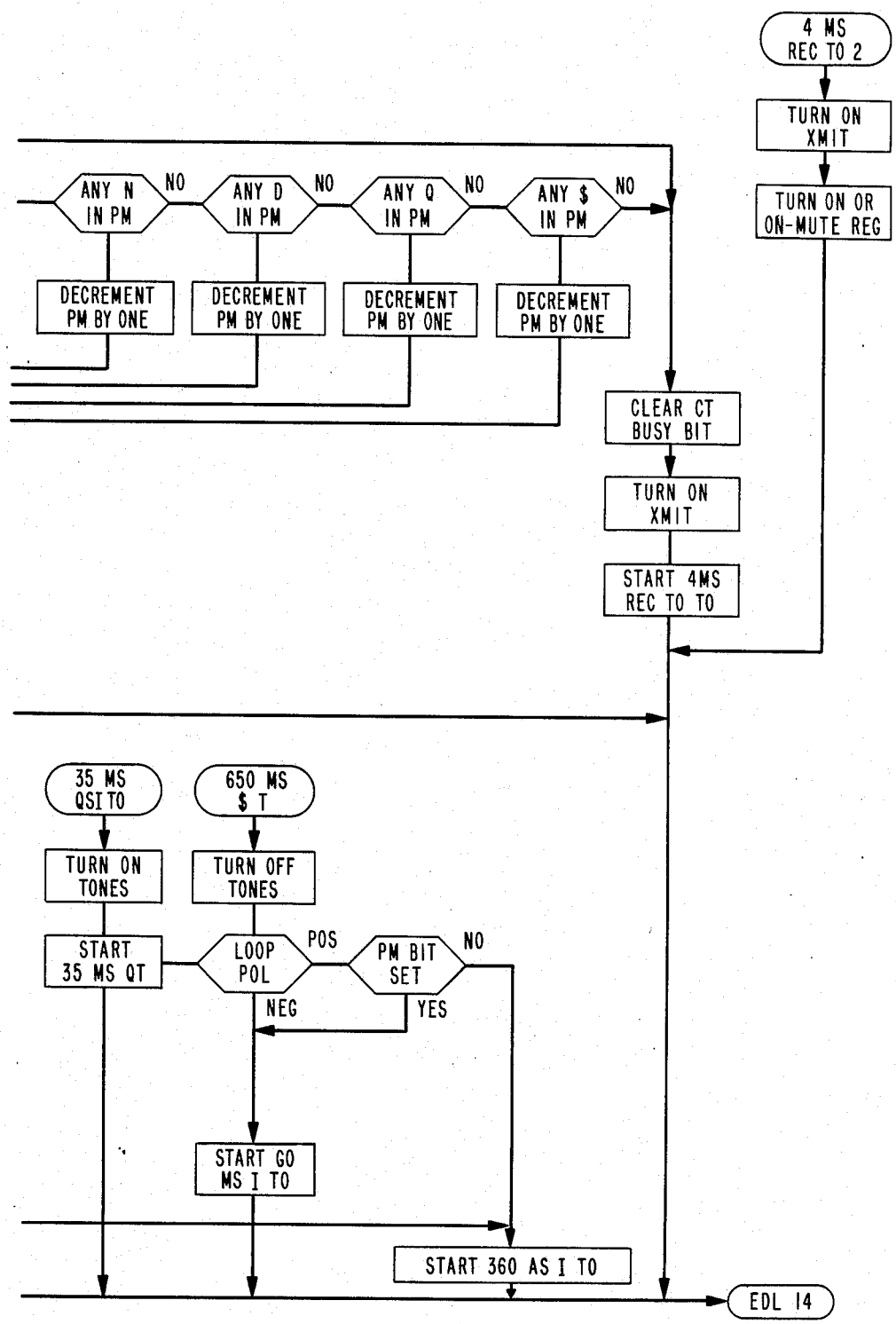

Shown in FIG. 9 are a fraud filter logic section and a fraud filter disable buffer. Whenever the microcomputer senses positive loop, It writes a 1 into the input lines 901 and 902 of a fraud filter latch to insert the fraud filter in the transmitted speech path.

The fraud filter latch consists of gates 910 through 918. The disable buffer consisting of transistors 920 through 922, and diodes 923 and 924, senses the state of the input signal on line 925 by comparing it with the L+ rail on line 456. An active pull up is used to pull line 925 high when that lead is left open. This causes the output of gate 918 to be low and the fraud filter latch to be able to insert the fraud filter into the transmit path via gate 917. If the line 925 is shorted to ground via line 458, the output of gate 918 goes high, disabling the output of the fraud filter latch. The comparator utilizes VCC on rail 451 for its power, the upper current base rail 490 from the VCC current source circuit, the L+ rail 456 for its voltage reference, and an active pull up of 1 milliamp from the L+ circuit. When the logic is not powered, such as during speech only mode, the logic output is below one $V_{BE}$.

Referring to FIGS. 10 through 18, there is shown flow charts for the control functions performed by the circuitry of FIGS. 1 and 2. The sequence in which these functions are performed is indicated by the flow chart, shown in sufficient detail to permit one skilled in the art to duplicate the circuitry of FIGS. 1 and 2, either by programming a microprocessor or by special purpose logic circuitry. Whereas the flow chart shows delayed times used in a particular application, it is readily apparent that it would be a simple matter to change the delay times for any other application.

Although a specific embodiment of the invention has been shown and described, it will be understood that is is but illustrative and that various modifications may be made therein without departing from the scope and spirit of this invention as defined in the appended claims.

What is claimed is:

1. A coin control arrangement for processing coins deposited in a coin telephone set line powered by a central office over a coin telephone subscriber loop, the arrangement comprising first coin detecting means located at the beginning of a coin path in the telephone set for providing a signal indication once a coin has been deposited therein;

coin disciminating means located in the coin path for determining the material composition and denomination of the inserted coin; and coin acceptance means operable in response to the coin discriminating means, the acceptance means diverting the coin from the coin path into a hopper only when the coin has been tested as good, the acceptance means further comprising a coin acceptor coil for operating a relay for diverting the coin from the coin path into the hopper, energy storage means connectable to the coin acceptor coil, a current source derived from the line power for charging the energy storage means to a predetermined voltage and switching means for transferring the energy stored in the energy storage means to the coin acceptor coil for operating the relay when the coin has been tested as good, the coin tested as bad continuing in the slot and exiting the telephone set.

2. The arrangment as in claim 1 further comprising:

testing means for checking the operational readiness of coin processing circuitry in the telephone set for recognizing the deposit of coins into the set and transmitting the coin deposit information to the central office; and control means operably responsive to a signal from the testing means reflecting that some of the circuitry in the telephone set is inoperative, the control means inhibiting the operation of coin processing circuitry, upon receipt of the signal from the testing means and causing all deposited coins to be returned to the customer, the control means also providing a trouble indication signal to the central office and the telephone set retaining its dial and speech capabilities while the circuitry tests inoperative.

3. The arrangement as in claim 2 wherein the testing means and control means comprise a computer for respectively interrogating and controlling the telephone coin processing circuitry.

4. The arrangement as in claim 3 wherein the coin processing circuitry comprises the first coin detecting means, the coin discriminating means, the coin acceptance means and second coin detecting means located at the end of the coin path, the coin discriminating means being juxtaposed between the first and second coin detecting means, and the first and second coin detecting means respectively providing an indication to the computer when a coin is entering and leaving the coin path.

5. The arrangement of claim 3 wherein the trouble indication signal is provided to the central office over the coin subscriber loop by the computer, the computer activating a trouble relay for providing a level of current at the central office relative of a stuck coin at the telephone set.

6. The arrangement of claim 1 further comprising:

a coin box for collecting coins deposited into the telephone set;

signaling means responsive to removal and replacement of the coin box, the signaling means transmitting to the central office a first combination of frequency tones after the coin box is initially removed and replaced, and transmitting a second combination of frequency tones after the coin box is removed and replaced a second time, the signaling means transmitting in alternating order the first and then the second combination of frequency tones each time the coin box is removed and replaced.

7. The arrangement of claim 6 wherein the first combination of frequency tones comprise a 1700 hertz signal and a 2200 hertz signal, and the second combination of frequency tones comprise a 1537 hertz signal and a 2200 hertz signal.

8. The arrangement as in claim 1 wherein the energy storage means comprises a capacitor.

* * * * *